US012576920B2

(12) United States Patent
Endres et al.

(10) Patent No.: US 12,576,920 B2
(45) Date of Patent: Mar. 17, 2026

(54) COMPONENT ASSEMBLY

(71) Applicant: Bayerische Motoren Werke Aktiengesellschaft, Munich (DE)

(72) Inventors: Martin Endres, Pfaffenhofen an der Ilm (DE); Franz Korber, Mallersdorf (DE); Christian Waldherr, Malgersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 500 days.

(21) Appl. No.: 17/917,613

(22) PCT Filed: May 31, 2021

(86) PCT No.: PCT/EP2021/064495

§ 371 (c)(1),
(2) Date: Oct. 7, 2022

(87) PCT Pub. No.: WO2022/002506

PCT Pub. Date: Jan. 6, 2022

(65) Prior Publication Data

US 2023/0159111 A1 May 25, 2023

(30) Foreign Application Priority Data

Jun. 30, 2020 (DE) ..................... 10 2020 117 183.8

(51) Int. Cl.
*B62D 27/02* (2006.01)
(52) U.S. Cl.
CPC ................................ *B62D 27/026* (2013.01)
(58) Field of Classification Search
CPC .. B62D 27/026; B62D 29/005; B62D 65/024; B29C 65/58; F16B 5/0642; F16B 5/07
See application file for complete search history.

(56) References Cited

U.S. PATENT DOCUMENTS 4,695,928 A * 9/1987 Schauwecker .......... B60R 13/06
                                                                                            362/267
5,209,541 A * 5/1993 Janotik .................. B62D 27/02
                                                                                             29/469
(Continued)

FOREIGN PATENT DOCUMENTS

AT          200300178 A  * 10/2003    ......... A47G 25/0678
CN          103485659 A      1/2014
(Continued)

OTHER PUBLICATIONS

International Search Report (PCT/ISA/210) issued in PCT Application No. PCT/EP2021/064495 dated Sep. 1, 2021 with English translation (four (4) pages).

(Continued)

*Primary Examiner* — Matthew R Mcmahon
(74) *Attorney, Agent, or Firm* — Crowell & Moring LLP

(57) ABSTRACT

A component assembly consists of a first, largely dimensionally stable component having at least two latching protrusions, which are largely diametrically opposed to each other and by which a second, flexible component can be positioned. The second component has cutouts corresponding to the latching protrusions. In an assembled end position, the latching protrusions are positionally fixed in the cutouts. At least one latching protrusion transitions, at the front and at the rear with respect to a positioning direction, into the first component at a largely right angle. Because of the design, very accurate positional fixing between the first component and the second component is possible.

8 Claims, 3 Drawing Sheets

(56)          References Cited

U.S. PATENT DOCUMENTS

| | | | | | |
|---|---|---|---|---|---|
| 5,464,171 | A | * | 11/1995 | Ripplinger | B29C 66/12821 |
| | | | | | 242/118.61 |
| 5,556,584 | A | * | 9/1996 | Yamazaki | B29C 65/562 |
| | | | | | 264/261 |
| 6,318,883 | B1 | * | 11/2001 | Sugiyama | B29C 66/542 |
| | | | | | 362/267 |
| 7,175,325 | B2 | * | 2/2007 | Otani | F21S 43/50 |
| | | | | | 362/519 |
| 7,560,003 | B2 | * | 7/2009 | Naughton | B29C 65/72 |
| | | | | | 156/303.1 |
| 8,870,272 | B2 | * | 10/2014 | De Luca | B62D 25/20 |
| | | | | | 296/184.1 |
| 10,604,193 | B2 | * | 3/2020 | Halang | B62D 25/14 |
| 11,440,701 | B2 | * | 9/2022 | Shawaf | B65D 19/0016 |
| 2018/0099701 | A1 | | 4/2018 | Halang | |

FOREIGN PATENT DOCUMENTS

| | | | |
|---|---|---|---|
| CN | 107017516 | A | 8/2017 |
| CN | 107690403 | A | 2/2018 |
| CN | 110023634 | A | 7/2019 |
| DE | 10 2005 047 129 | A1 | 4/2007 |
| DE | 10 2016 209 962 | A1 | 12/2017 |
| DE | 10 2018 212 054 | A1 | 1/2020 |
| EP | 1612902 | A2 * | 1/2006 .......... H02G 15/113 |
| EP | 2 500 162 | A1 | 9/2012 |

OTHER PUBLICATIONS

German-language Written Opinion (PCT/ISA/237) issued in PCT Application No. PCT/EP2021/064495 dated Sep. 1, 2021 (five (5) pages).

German-language Search Report issued in German Application No. 10 2020 117 183.8 dated Feb. 10, 2021 with partial English translation (10 pages).

English translation of Chinese-language Office Action issued in Chinese Application No. 202180030458.X dated Jun. 3, 2023 (9 pages).

* cited by examiner

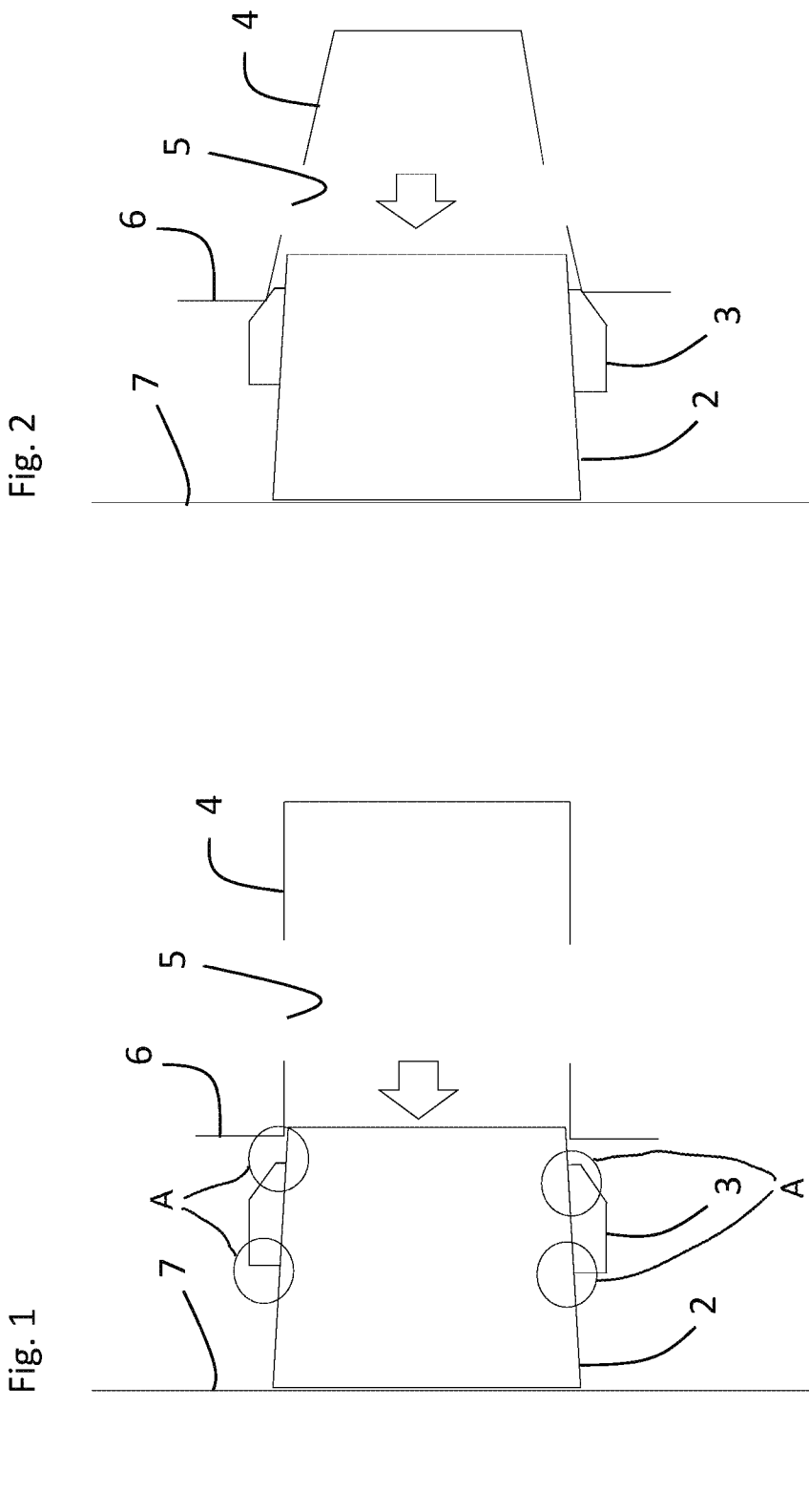

COMPONENT ASSEMBLY

BACKGROUND AND SUMMARY

The invention relates to a component assembly having a first, largely dimensionally stable component with at least two latching lugs that are largely diametrically offset with respect to one another and which are used to position a second, flexible component.

When connecting, for example, vehicle body components, for example composed of aluminum, such as extruded profiles, aluminum die castings, etc., use is often made of blind rivets, self-piercing rivets or, for example, flow drill screws.

The disadvantages of these technologies are the high costs for the tools of the connecting technique and the high costs for the connecting elements.

In order to avoid these disadvantages, German laid-open specification DE 10 2018 212 054 A1, from which the present invention proceeds, proposes a component assembly comprising a sheet-metal part and a joining partner to which the sheet-metal part is snap-fit connected. In the snap-fit connection, at least one snap-fit element of the sheet-metal part is latched in a cutout of the joining partner, wherein the snap-fit element of the sheet-metal part comprises a sheet-metal web, the sheet-metal web foot portion of which transitions into a sheet-metal part base body of the sheet-metal part. The sheet-metal part and the joining partner are joined together in a joining direction, wherein, in a joining operation, the joining partner pushes the sheet-metal web, with the formation of an elastic restoring force, into an unlocking position and, when a joining position has been reached, the sheet-metal web snaps, with the formation of a restoring force, into its locking position in which a latching contour of the snap-fit element engages in the joining partner cutout in a form-fitting manner. According to the invention, the snap-fit element of the sheet-metal part comprises an additional element on which the latching contour is formed. The additional element is connected in the form of a separate attachment part to the sheet-metal web.

Even if this prior art has no direct disadvantage, the present invention is based on the object of developing a generic component assembly in such a way that an even greater accuracy of fit is obtained.

This object is achieved by a first, largely dimensionally stable component having at least two latching lugs that are largely diametrically offset with respect to one another and which are used to position a second, flexible component, wherein the second component comprises cutouts which correspond to the latching lugs. In an assembled final position, the latching lugs are positionally fixed in the cutouts. At least one latching lug transitions, at a front and rear in a positioning direction, into the first component at a largely right angle.

In the proposed technique, the component-integrated features advantageously help one another. In addition, no tools and connecting elements are required since these have already been integrated implicitly in the components. Owing to the largely right angle at the transition of the latching lugs into the first component, an extremely precise accuracy of fit is obtained.

By means of the configuration wherein a height of the right-angled portion corresponds to at least half the material thickness of the second component in the region of the cutout, the pushing of the second component onto the first component is made easier, wherein a maximum positional fixation is ensured.

The configuration wherein the second component has a U-shaped or V-shaped cross section concerns particularly preferred exemplary embodiments.

The configuration wherein at least one flange, for which a corresponding surface is provided, is arranged at the ends of the U-shaped or V-shaped cross section, increases the mechanical stability of the second component.

Since an extremely exact positional fixation is made possible by way of the latching lugs and the cutouts, a gap can be constituted between the flange and the corresponding surface.

In a particularly preferred embodiment, an adhesive may be arranged in this gap. This is particularly advantageous if the adhesive connection constitutes the actual mechanical strength of the component assembly. In this case, the adhesive can cure without tensile or compressive stresses and subsequently assume a desired load-bearing function.

Preferably, the first component is a structural component, such as a longitudinal member or a transverse member of a body of a motor vehicle.

Furthermore, the second component is preferably composed of a sheet metal. However, it is also possible for plastics, such as GFRP or CFRP (glass-fiber-reinforced or carbon-fiber-reinforced plastics), to be used. These have a sufficient flexibility so that the second component can be pushed over the first component and latched therewith without any problems.

The invention is explained in more detail below on the basis of five figures.

BRIEF DESCRIPTION OF THE DRAWINGS

FIG. 1 schematically shows a first component and a second component prior to an assembly operation.

FIG. 2 shows the first component and the second component during an assembly operation.

In the following text, the same reference numerals apply to identical structural elements in FIGS. 1 to 5.

DETAILED DESCRIPTION OF THE DRAWINGS

Figures 3, 4:
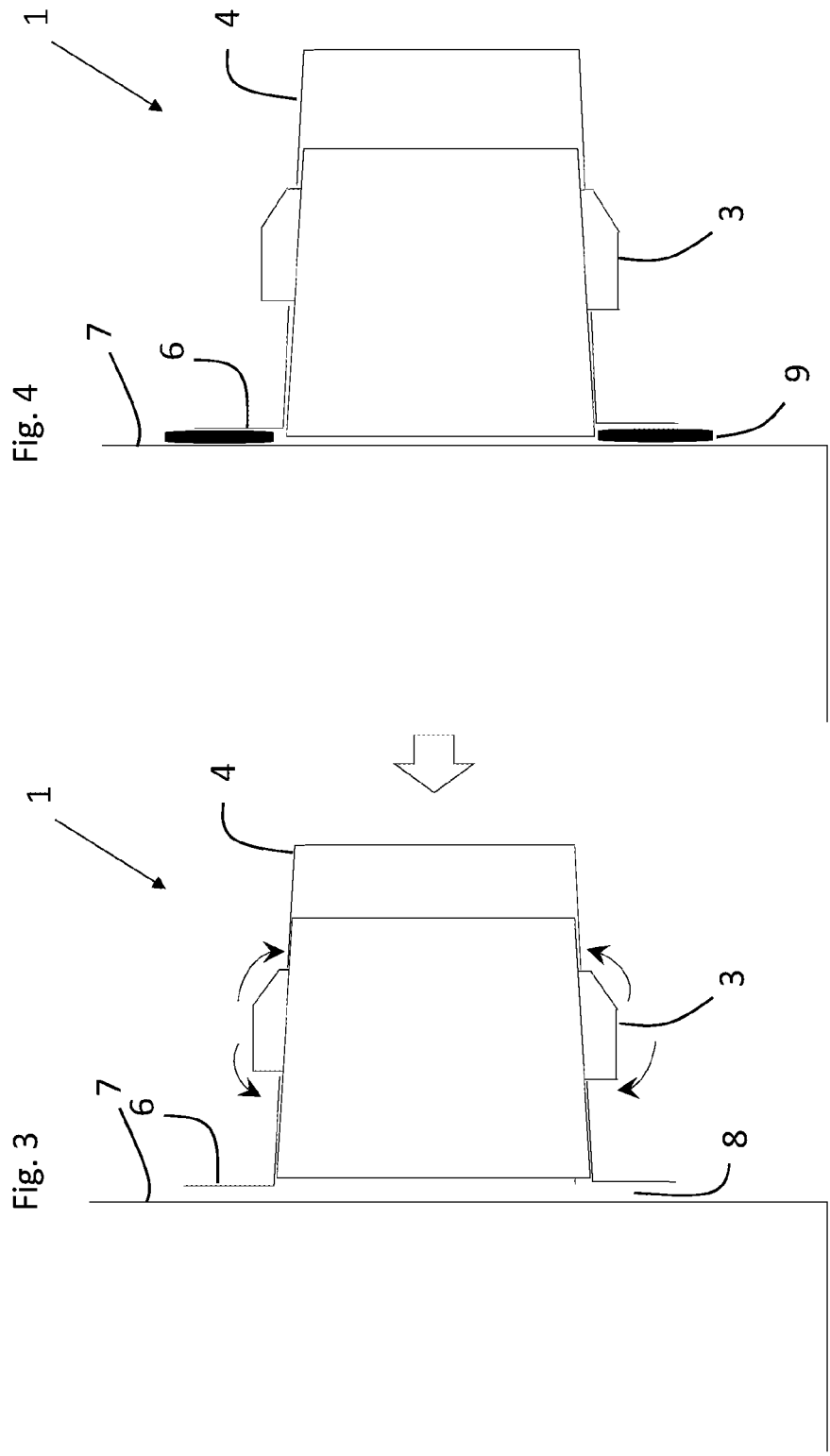
FIG. 3 shows the first component and the second component after completed assembly.
FIG. 4 shows the first component and the second component after completed assembly with an adhesive bond.

FIG. 1 schematically shows a section through a component assembly 1 which is constituted by a first component 2 and a second component 4. Such a generic component assembly 1 can find use, for example, in body construction for motor vehicles.

The first component 2 is a largely dimensionally stable component, such as an extruded aluminum profile, and comprises at least two latching lugs 3 which are largely diametrically offset with respect to another. Largely diametrical is understood to mean that the latching lugs 3 may be arranged exactly opposite one another, but may also differ from 180° by up to 90°, such that latching engagement of the latching lugs 3 is always ensured.

Compared with the first component 2, the second component 4 is composed of a flexible material, such as a sheet metal or plastic. In the present exemplary embodiment, the second component 4 is bent into an approximate U shape and comprises a flange 6 on the side facing the first component 2. This flange 6 is arranged on both sides of the U-shaped second component 4, only one flange 6 being numbered. Furthermore, the second component 4 comprises cutouts 5 which correspond to the latching lugs 3 in an assembled state, in the component assembly 1. A direction for pushing the second component 4 onto the first component 2 is represented by an arrow.

According to the invention, the latching lugs 3 have, at the front and rear in a positioning direction, a largely right angle at the transition into the first component 2. A largely right angle means that said angle may be 10 degrees more or less than 90 degrees. In the present exemplary embodiment, both latching lugs 3 have the configuration according to the invention. In a further exemplary embodiment, it is also possible for only one latching lug 3 to have the configuration according to the invention. For identification purposes, the configuration according to the invention is highlighted by dotted circles A.

A height of the right-angled portion corresponds to at least half the material thickness of the second component 4 in the region of the cutout 5. Particularly preferably, the height of the right-angled portion lies between half the material thickness of the second component 4 in the region of the cutout 5 and the full material thickness of the second component 4 in the region of the cutout 5. In this way, a particularly exact positioning in an installed state, in the form of the component assembly 1, is possible.

Furthermore, the second component 4 is preferably of U-shaped or V-shaped configuration, thus making it significantly easier to push the second component 4 onto the first component 2. As in the present exemplary embodiment, at least one flange 6, for which a corresponding surface 7 is provided, is preferably arranged at the ends of the U-shaped or V-shaped cross section. This flange 6 provides the second component 4 with very good dimensional stability. In the present exemplary embodiment, the first component 2 and the corresponding surface 7 are illustrated as separate components, but they may also be embodied in one piece.

Since the exact positional fixation is effected by means of the latching lugs 3 and the cutouts 5, a gap 8, illustrated in FIGS. 3 and 4, may be formed between the flange 6 and the corresponding surface 7 in the assembled final position, in the form of the component assembly 1. This gap is particularly advantageous if an adhesive 9 is arranged between the flange 6 and the corresponding surface 7, as illustrated in FIG. 4. In this case, prior to the final assembly operation to form the component assembly 1, the adhesive 9 is applied, in the region of the flange 6, to the corresponding surface 7 and/or to the flange 6, and the first component 2 is pushed onto the second component 4 and latched therewith. In this state, the adhesive can then cure in a manner free from tensile or shear forces and can assume a load-bearing role for the entire component assembly 1.

As has already been mentioned, the first component 2 is preferably a structural component, such as a longitudinal member or a transverse member of a body of a motor vehicle, the second component preferably being composed of a flexible sheet metal. In other exemplary embodiments, the second component 4 may also be produced from a plastic.

FIG. 2 once again shows the component assembly 1 from FIG. 1, but during an operation of assembling the first component 2 and the second component 4 to form the component assembly 1.

As can be seen in FIG. 2, the U-shaped limbs of the second component 4 are spread apart slightly on the latching lugs 3 and are subsequently pushed over the latching lugs 3 until they engage with latching action.

FIG. 3 once again shows the component assembly 1 from FIGS. 1 and 2, in a final assembly position. After the second component 4 has been pushed onto the first component 2, the limbs of the U-shaped second component 4 snap down onto the first component 2 on account of their flexibility, the latching lugs 3 being locked exactly in position by the cutouts 5. A snap-closing movement of the second component 4 onto the first component 2 is illustrated symbolically by four arrows. As is also apparent from FIG. 3, a gap 8 remains open between the flanges 6 and the corresponding surface 7 after the final assembly.

As can be seen in FIG. 4, prior to an assembly operation of the component assembly 1, an adhesive, denoted by numeral 9, may be applied in the region of the flanges 6. This adhesive may be applied either to the corresponding surface 7 and/or the flanges 6.

As has already been mentioned, the component-integrated features help one another in the proposed technique according to the invention. Advantageously, no tools and connecting elements are required since these have already been integrated in the components.

Figure 5:
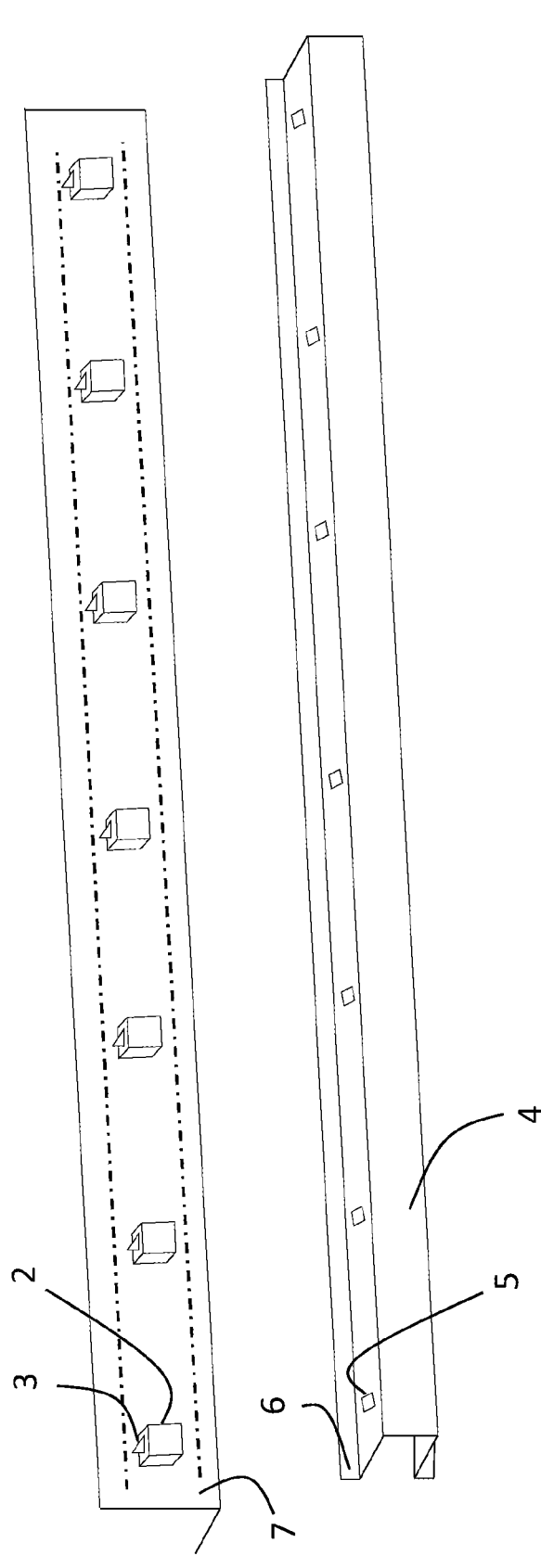
FIG. 5 shows by way of example a design implementation for the first component and the second component.

FIG. 5 schematically shows an exemplary design embodiment for a component assembly 1 according to the invention. In this exemplary embodiment, seven first components 2 are each provided with two latching lugs 3 which are arranged onto the corresponding surface 7. On account of the illustration, only the upper latching lug 3 can be seen in each case. The corresponding surface 7 and the first components 2 may also be embodied in one piece in another exemplary embodiment. Two dot-dashed lines extending parallel to the seven second components 2 are illustrated on the corresponding surface 7. These dot-dashed lines are symbolic of the fact that an adhesive may be applied in these regions prior to a final assembly of the first component 2 and the second component 4.

The second component 4 comprises, corresponding to the seven first components 2, 14 corresponding apertures 5, of which again only seven upper apertures 5 can be seen. The second component 4 also comprises flanges 6, of which only one is numbered, on both sides of the U-shaped limbs.

As has already been described, during an assembly operation to form a component assembly 1, the second component 4 is pushed onto the first component 2 until the apertures 5 engage around the latching lugs 3 with latching action and permit an exact positional fixation of the component assembly 1.

LIST OF REFERENCE DESIGNATIONS

1. Component assembly
2. First component
3. Latching lug
4. Second component
5. Cutout
6. Flange
7. Corresponding surface
8. Gap
9. Adhesive

The invention claimed is:
1. A component assembly, comprising:
a first, largely dimensionally stable, component having at least two latching lugs which are largely diametrically offset with respect to one another; and
a second, flexible, component, wherein the latching lugs are used to position the second component, wherein the second component comprises cutouts which correspond to the latching lugs, wherein, in an assembled final position, the latching lugs are positionally fixed in the cutouts, wherein at least one latching lug transitions, at a front face and a rear face in a positioning direction, into the first component at a largely right angle, and in the assembled final position, the font face and the rear face extend into the corresponding cutout; and wherein the at least one latching lug is positioned on the first component such that the first component extends in the positioning direction forward and rearward of the at least one latching lug.

2. The component assembly according to claim 1, wherein a height of the right-angled portion corresponds to at least half a material thickness of the second component in a region of the cutouts.

3. The component assembly according to claim 1, wherein the second component has a U-shaped or V-shaped cross section.

4. The component assembly according to claim 3, wherein the first component comprises a flange mounting surface, and the second component comprises at least one corresponding flange arranged at free ends of the U-shaped or V-shaped cross section.

5. The component assembly according to claim 4, wherein in the assembled final position, a gap is provided between the at least one corresponding flange and the flange mounting surface.

6. The component assembly according to claim 5, wherein an adhesive is arranged between the at least one corresponding flange and the flange mounting surface.

7. The component assembly according to claim 1, wherein the first component is a structural component.

8. The component assembly according to claim 7, wherein the second component is composed of sheet metal.

* * * * *